United States Patent [19]

Omura et al.

[11] Patent Number: 4,530,996
[45] Date of Patent: Jul. 23, 1985

[54] BISAZO BLUE-BLACK DYE HAVING VINYLSULFONE TYPE FIBER-REACTIVE GROUP

[75] Inventors: Takashi Omura, Ashiya; Naoki Harada; Yasuo Tezuka, both of Ibaraki, all of Japan

[73] Assignee: Sumitomo Chemical Company, Limited, Osaka, Japan

[21] Appl. No.: 384,889

[22] Filed: Jun. 4, 1982

[30] Foreign Application Priority Data

Jun. 15, 1981 [JP] Japan .................................. 56-92674
Jul. 1, 1981 [JP] Japan .................................. 56-103794
Dec. 16, 1981 [JP] Japan .................................. 56-203994
Feb. 19, 1982 [JP] Japan .................................. 57-26504

[51] Int. Cl.³ .................. C09B 62/503; C09B 62/513; D06P 1/38; D06P 3/66
[52] U.S. Cl. .................................... 534/642; 534/581; 534/582; 534/617; 534/727; 534/730; 534/840; 534/879
[58] Field of Search .............. 260/191, 186, 185, 178; 534/642

[56] References Cited

U.S. PATENT DOCUMENTS 3,135,730 6/1964 Heyna et al. ...................... 260/147
3,457,251 7/1969 Meininger et al. ................. 260/148

FOREIGN PATENT DOCUMENTS 1558679 1/1969 France .......................... 260/191
1213988 11/1970 United Kingdom .............. 260/153

Primary Examiner—Floyd D. Higel
Attorney, Agent, or Firm—Stevens, Davis, Miller & Mosher

[57] ABSTRACT

A compound represented by a free acid of the formula:

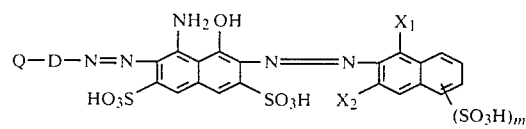

wherein D is

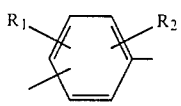

($R_1$ and $R_2$ independently represent hydrogen, methyl or methoxy) or

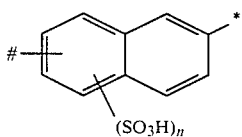

(n is 0 or 1, the mark * signifies the position of linkage to —N=N— and the mark # signifies the position of linkage to Q mentioned below); Q is —SO$_2$CH=CH$_2$ or —SO$_2$CH$_2$CH$_2$R (R is a group capable of being split off by the action of alkali); one of $X_1$ and $X_2$ is hydrogen and the other is a sulfonic acid group; and m is 0 or 1, which is useful for dyeing cellulose fibers a blue-black color with good dyeability and excellent fastnesses, particularly chlorine fastness.

7 Claims, No Drawings

BISAZO BLUE-BLACK DYE HAVING VINYLSULFONE TYPE FIBER-REACTIVE GROUP

The present invention relates to new reactive mono-functional bisazo dyes which are capable of dyeing cellulose fibers a blue-black color, and which have good dyeability and excellent fastness properties.

It is well known that dyes having a β-sulfatoethylsulfonyl group may be used to dye cellulose materials; dyes of this type are known as the so-called vinylsulfone type reactive dyes. However, reactive mono-functional bisazo blue-black dyes capable of giving dyed products superior in dyeability and various fastnesses, particularly chlorine fastness, have not previously been known, and this has frequently become a problem in the field of groud dyeing in accordance with dip dyeing. Consequently, there has been a strong demand for the development of blue-black reactive dyes superior in chlorine fastness and dyeability.

As an example of a reactive bis-functional bisazo dye capable of dyeing cellulose fibers a blue-black color, there has hitherto been known C. I. Reactive Black 5, represented by a free acid of the formula:

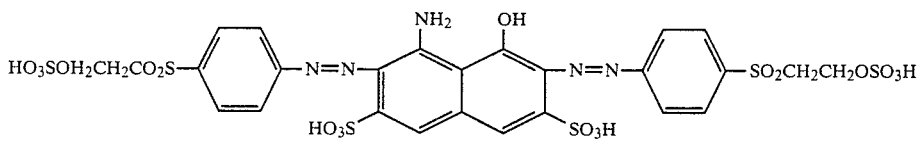

which is obtainable by diazotizing 2 moles of 1-aminobenzene-4-β-sulfatoethylsulfone and coupling the diazotized product with 1 mole of 1-amino-8-hydroxynaphthalene-3,6-disulfonic acid. This dye is marketed under the trade name of Remazol Black B, as well as other names, and is already in use as a reactive bis-functional bisazo dye. However, the dyed products obtained with this dye do not always have sufficient fastnesses. Particularly in the case of dip dyeing, the ratio of reaction with cellulose fibers is low or, in other words, the fixation yield of the dye is low, in spite of the fact that the dye has two fiber-reactive groups (i.e. β-sulfatoethylsulfonyl groups) in one molecule, so that it must be used in a large amount in order to obtain a deeply colored dyed product, which is expensive and contrary to the requirement of today's consumers.

More than ten years after the appearance of C. I. Reactive Black 5, the dyes discussed below were developed and described in the published literature in an attempt to overcome the faults of this dye.

Thus, for example, bisazo reactive dyes capable of dyeing cellulose fibers to give a blue-black colored dyed product are disclosed in Published Examined Japanese Patent Application No. 15,299/68. However, follow-up studies by the present inventors have revealed that these dyes need improvements with respect to various fastnesses, particularly chlorine fastness, and with respect to solubility, exhaustion yield, fixation yield and build-up property. For example, the dye described in Example 1 of the above-mentioned patent specification, represented by the following formula:

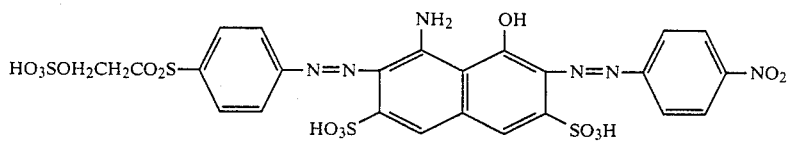

has a chlorine fastness of 1 grade (ISO method), and as a result it is not improved in this respect as compared with C. I. Reactive Black 5, and its solubility in water is as low as less than 30 g/liter.

Further, the dye described in Example 5 of the same specification, represented by the following formula:

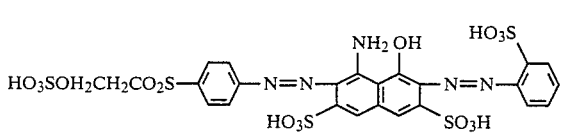

is somewhat improved in solubility, but it must be used in a larger amount than C. I. Reactive Black 5 in order to dye cellulose fibers with the same color depth, and it still has an insufficient build-up property.

Further, the dye described in Example 13 of the same specification, represented by the following formula:

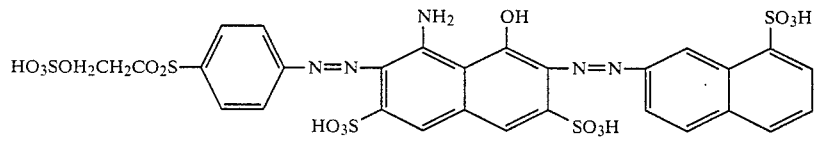

and the dye mentioned in Example 14 of the same specification, represented by the following formula:

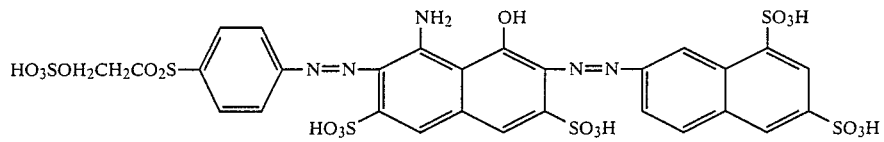

both have a chlorine fastness of 1 grade (ISO method), and must be used in a greater amount than C. I. Reactive Black 5 in order to dye cellulose fibers so as to provide the same color depth, and still have an insufficient build-up property.

Similar disazo reactive dyes are also disclosed in Published Examined Japanese Patent Application No. 4,337/70. These dyes still have unsolved practical problems with respect to fastnesses, particularly chlorine fastness, and build-up property.

For example, the dye disclosed in Example 15 of the above-mentioned patent specification, represented by the following formula:

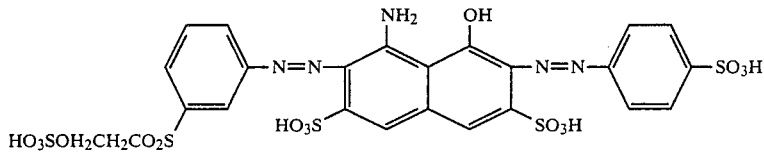

has a chlorine fastness of 1 grade (ISO method) and is inferior in build-up property.

Further, the dyes disclosed in Examples 15 and 16 of German Pat. No. 1,644,198, represented by the following formulas:

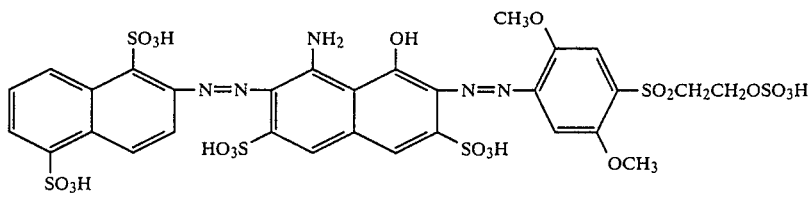

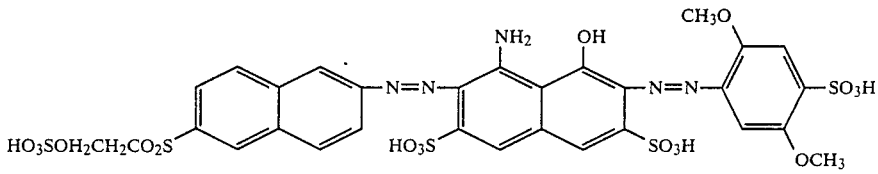

have similarly insufficient properties. As discussed above, none of the dyes disclosed in prior literatures can be said to have performances sufficiently fit for practical use.

The present inventors have conducted careful studies with the objective of developing a reactive blue-black dye capable of fulfilling the requirement of today's consumers. As a result of these studies, it has been found that a specified bisazo compound having, in its structure, a specified number of sulfonic acid groups at specified positions and having only one fiber-reactive group per molecule at a specified position exhibits excellent performances.

The present invention provides a compound represented by a free acid of the formula (I):

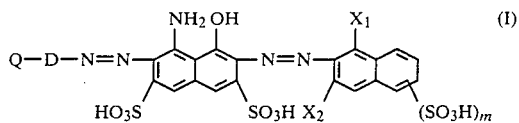

wherein D is

($R_1$ and $R_2$ independently represent hydrogen atom, methyl group or methoxy group) or

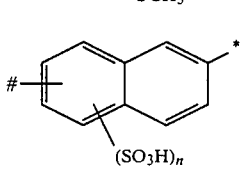

(n is 0 or 1, the mark * denotes the position of linkage to —N=N— and the mark # denotes the position of linkage to Q mentioned below); Q is —$SO_2CH=CH_2$ or —$SO_2CH_2CH_2R$ (R represents a group capable of being split off by the action of alkali), one of $X_1$ and $X_2$ is hydrogen and the other is a sulfonic acid group; and m is 0 or 1.

The present invention also provides a process for producing the compound of the formula (I). Thus, the invention relates to a process for producing the compound of formula (I) by coupling 1-amino-8-hydroxynaphthalene-3,6-disulfonic acid firstly with a diazonium compound of an aromatic amine represented by the formula (II):

Q—D—NH₂   (II)

wherein D and Q are as defined above, in an acidic medium to form a monoazo compound represented by a free acid of the formula,

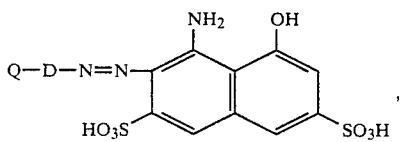

wherein D and Q are as defined above, and then coupling the monoazo compound with a diazonium compound of an aromatic amine represented by the formula (III):

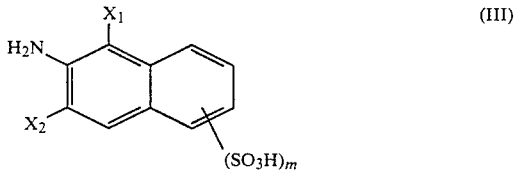

wherein $X_1$, $X_2$ and m are as defined above, in a weakly acidic or weakly alkaline medium; as well as to a process for dyeing cellulose fibers by using said compound.

The group R capable of being split off with alkali includes, for example, a halogen atom such as chlorine and bromine atoms; an ester of an organic carboxylic acid and sulfonic acid such as lower alkanoyloxy residue (for example, acetyloxy residue), benzoyloxy residue and benzenesulfonyloxy residue; or an acid ester of phosphoric acid or sulfuric acid, of which free acid form is represented by the formula —OPO₃H₂ or —O-SO₃H; or the like.

That is, R may be anything so long as it can be split off by the action of alkali, thereby converting —SO₂CH₂CH₂R to —SO₂CH=CH₂. Among these examples of the group R, —OSO₃H is particularly preferable from the viewpoint of readiness of production and ability to give water-solubility. Therefore, —SO₂CH₂CH₂OSO₃H is particularly preferable as Q.

Preferable compounds of the present invention are represented by a free acid of the formulas:

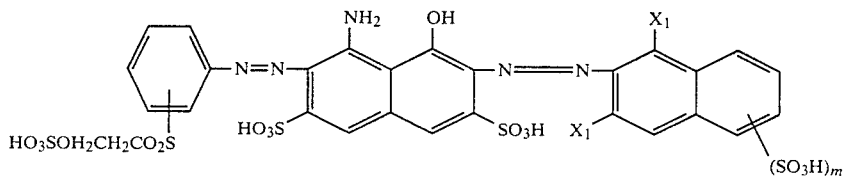

wherein $X_1$, $X_2$ and m are as defined above, and the group —SO₂CH₂CH₂OSO₃H is in ortho, meta or para position with regard to —N=N—; and

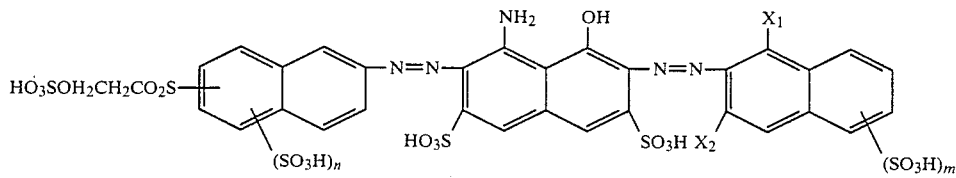

wherein $X_1$, $X_2$, m and n are as defined above.

As examples of the aromatic amine of the formula (II) usable for the production of the bisazo compound (I), the following compounds are given:
  1-aminobenzene-2-, -3- or -4-β-sulfatoethylsulfone,
  1-amino-2- or -4-methoxybenzene-5-β-sulfatoethylsulfone,
  1-amino-2-methoxy-5-methylbenzene-4-β-sulfatoethylsulfone,
  1-amino-2,5-dimethoxybenzene-4-β-sulfatoethylsulfone,
  1-amino-2,4-dimethylbenzene-5-β-sulfatoethylsulfone,
  1-amino-2,4-dimethoxybenzene-5-β-sulfatoethylsulfone,
  2-naphthylamine-8-β-sulfatoethylsulfone,
  2-naphthylamine-5-β-sulfatoethylsulfone,
  2-naphthylamine-6- or -7-β-sulfatoethylsulfone,
  2-naphthylamine-6-sulfo-8-β-sulfatoethylsulfone,
  2-naphthylamine-8-sulfo-6-β-sulfatoethylsulfone, and
  2-naphthylamine-1-sulfo-6-β-sulfatoethylsulfone.

There can also be referred to those compounds which can be obtained by replacing the sulfuric ester group of the above-mentioned compounds with a phosphoric ester group, acetyloxy group, propionyloxy group, n- or iso-butyryloxy group, benzoyloxy group, benzenesulfonyloxy group or the like.

As the compounds of the formula (III), the following examples are given:
  2-naphthylamine-1-sulfonic acid,
  2-naphthylamine-1,5- or -1,7-disulfonic acid, and
  2-naphthylamine-3,6-disulfonic acid.

Depending on the reaction conditions, the above-mentioned starting compounds exist in the form of acid and/or salt, particularly alkali metal salt, or are used in such form.

The compound of the present invention represented by the formula (I) may be produced in the following manner.

The aromatic amine represented by the formula (II) is diazotized with sodium nitrite in an acidic condition of mineral acid at a temperature of −10° C. to +30° C. On the other hand, the aromatic amine represented by the formula (III) is also diazotized by the same method. Thereafter, 1-amino-8-hydroxynaphthalene-3,6-disulfonic acid or its salt is coupled with the diazotized amine (II) to form a corresponding monoazo compound, which is then coupled with the diazotized amine (III), whereby the compound (I) can be produced.

The coupling reaction of the first step can be carried out by effecting the reaction at a temperature of $-10°$ to $+30°$ C., under acidic conditions, preferably at pH value of 0.5–4.0, over a time period of 2–10 hours. The coupling reaction of the second step can be carried out by effecting the reaction at a temperature of 0°–40° C., under weakly acidic or weakly alkaline conditions, preferably at pH value of 4–8.5, over a time period of 1–5 hours.

In the steps of diazotization and coupling, various surfactants; hydrating agents such as urea, thiourea, ethylene glycol and the like; and catalysts such as sodium formate, sodium acetate, pyridine and the like may be added.

The bisazo compound produced by the present invention may be separated by generally well-known methods, i.e. by a salting-out process using an electrolyte such as sodium chloride or potassium chloride, or by evaporation of the reaction mixture, such as spray-drying, after addition of assistants such as stabilizers, if necessary.

The bisazo compound of the present invention can exist in the form of a free acid, as well as in the form of its salt. Preferably, however, it exists in the form of a salt such as a salt of an alkaline earth metal, and particularly in the form of the sodium salt, potassium salt or calcium salt. The more preferable forms are the sodium salt and potassium salt.

The bisazo compound (I) may be in a mixture of those having $-SO_2CH_2CH_2R$ (R is as defined above) and $-SO_2CH=CH_2$ as the fiber-reactive group Q, which are able to be produced depending on the reaction conditions.

The bisazo compounds (I) of the present invention are capable of dyeing cellulose fibers, particularly natural or regenerated cellulose such as cotton and viscose rayon.

Dyeing may be carried out using the bisazo compound (I) of the present invention and an acid-binding agent such as sodium hydroxide, sodium carbonate, phosphates, silicates or sodium hydrogen carbonate. A method of dyeing may be selected depending upon the property and physical form of fibers, and for example, exhaustion dyeing, printing and continuous dyeing including cold.pad.batch.up dyeing may be employed.

Exhaustion dyeing may be carried out at a relatively low temperature using a dye bath containing the bisazo compound (I) of the present invention and an acid-binding agent (e.g. sodium carbonate, trisodium phosphate, sodium hydroxide) as well as an electrolyte (e.g. sodium sulfate or sodium chloride).

Printing may be carried out by applying the bisazo compound (I) of the present invention onto fibers together with a thickening agent or emulsion thickening agent (e.g. sodium alginate, starch ether), an alkali or alkali-releasing agent (e.g. sodium carbonate, sodium hydrogen carbonate, sodium hydroxide, trisodium phosphate, sodium trichloroacetate, corresponding potassium or alkaline earth metal compounds) and if necessary a printing assistant (e.g. urea) or dispersing agent, followed by drying and heat treatment, preferably in the presence of steam.

Cold.pad.batch.up dyeing may be carried out by padding the bisazo compound (I) of the present invention onto cloth in the vicinity of room temperature together with an acid-binding agent (e.g. sodium hydroxide, a mixture of sodium hydroxide with sodium silicate, sodium carbonate or trisodium phosphate), if necesssary sodium sulfate or sodium chloride, and as need arises, a dissolution assistant (e.g. urea) or penetrating agent; batching up the cloth on a roller; and allowing it to stand for at least 3 hours or over night; followed by washing with water and drying.

Although the bisazo compound (I) of the present invention has only one fiber-reactive group in one molecule, its parent structure as a dye and the kind, number and position of substituents are selected and devised so that it can dye cellulose fibers deeply and can give a dyed product excellent in fastnesses. That is to say:

(1) The compound of the present invention has two azo groups and at least two naphthalene rings in one molecule.
(2) The one diazo component (benzene or naphthalene residue) having one fiber reactive group is located at the 2-position of the coupling component, 1-amino-8-hydroxynaphthalene-3,6-disulfonic acid, and the other diazo component (naphthalene residue) having no fiber-reactive group is located at the 7-position of the coupling component.
(3) The number of sulfonic acid groups in one molecule is 3 to 5.
(4) All the sulfonic acid groups are bonded to the carbon atoms of the naphthalene rings, at least three of said carbon atoms being adjacent to the carbon atoms bonded to the azo groups. Particularly, the azo group at the 7-position of the coupling component lies between two sulfonic acid groups, which are each bonded to each carbon atom of the coupling component and the other diazo component, respectively, said each carbon atom being adjacent to each carbon atom bonded to said azo group.

Because of the above-mentioned characteristic features of molecular structure, the bisazo compound of the present invention is much superior in performances to the known dyes disclosed in the prior art. That is, as compared with the dyes disclosed in Published Examined Japanese patent application No. 15,299/68, Published Examined Japanese patent application No. 4,337/70 and German Pat. No. 1,644,198, the bisazo compound of the present invention has a higher solubility in water and, in addition, it can dye cellulose fibers with higher exhaustion yield, fixation yield and build-up property, and the product dyed therewith is superior in fastnesses such as light fastness, perspiration-light fastness and the like and particularly in chlorine fastness.

Further, the compound of the present invention is essentially different from C. I. Reactive Black 5 in that it has only one fiber-reactive group in one molecule, while C. I. Reactive Black 5 has two fiber-reactive groups. Nevertheless, the compound of the present invention is excellent in fastnesses, particularly chlorine fastness, of the dyed product obtained therefrom, and can give a dyed product having particularly desirable performances with respect to color value and fixation yield.

The present invention will be illustrated with reference to the following examples. All parts in the examples are by weight, unless otherwise specified.

EXAMPLE 1

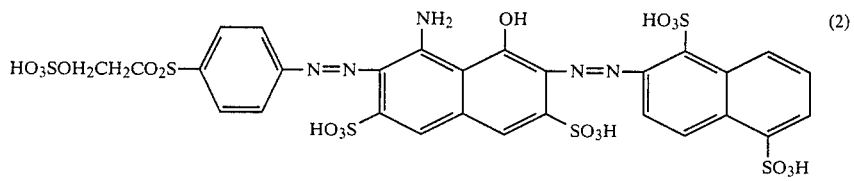

2-Naphthylamine-1-sulfonic acid (11.25 parts) was diazotized by the usual method and the excessive nitrous acid was removed with sulfamic acid. The solution thus obtained was added to a suspension of 30.55 parts of 1-amino-2-(4-β-sulfatoethylsulfonylphenylazo)-8-hydroxynaphthalene-3,6-disulfonic acid at a temperature of 0°–10° C. and a pH value of 0.5–2 (the suspension was prepared by diazotizing 1-aminobenzene-4-β-sulfatoethylsulfone by the usual method and coupling it by adding dropwise a neutral solution of 1-amino-8-hydroxynaphthalene-3,6-disulfonic acid). The resulting mixture was adjusted to pH 6–8.5 by adding sodium hydrogen carbonate at 5°–15° C. over a time period of about one hour, and the mixture was stirred until diazo compound had become undetectable. By adjusting the reaction mixture to pH 4.5–5.5 and drying it, a bisazo compound of which the free acid form is represented by the following formula (1) was obtained:

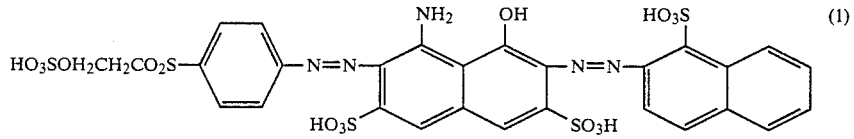

[$\lambda_{max}$ 615 nm (in water solvent); the same condition of measurement was employed also in the following examples]

EXAMPLE 2

2-Naphthylamine-1,5-disulfonic acid (15.17 parts) was diazotized by the usual method, and the excessive nitrous acid was removed with sulfamic acid. To the solution thus obtained was added a neutral aqueous solution containing 33.85 parts of trisodium salt of 1-amino-2-(4-β-sulfatoethylsulfonylphenylazo)-8-hydroxynaphthalene-3,6-disulfonic acid. The resulting mixture was kept at pH 4–7 for 3 hours at 10°–20° C. by adding dropwise 15% aqueous solution of sodium carbonate. After diazo compound had become undetectable, the mixture was salted out at pH 4–6 at 30°–40° C. and filtered. The wet cake thus obtained was dissolved into water, pH of the resulting solution was adjusted to 5–6 by adding an equimolar amount of sodium phosphate monobasic thereto, and then the solution was dried. Thus, a bisazo compound of which the free acid form is represented by the following formula (2) was obtained:

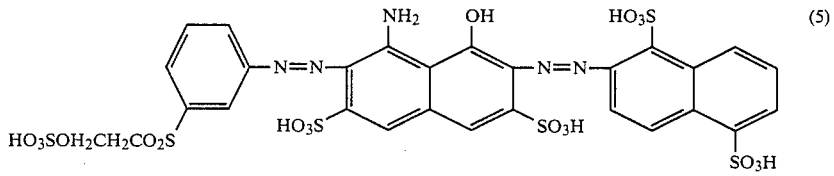

[$\lambda_{max}$ 611 nm]

EXAMPLES 3–4

The procedure of Example 1 was repeated, except that the 2-naphthylamine-1-sulfonic acid was replaced with the starting compounds shown below:
  (3) 2-naphthylamine-3,6-disulfonic acid
  (4) 2-naphthylamine-1,7-disulfonic acid
As the result, the corresponding bisazo compounds were obtained.

EXAMPLE 5

2-Naphthylamine-1,5-disulfonic acid (15.17 parts) was diazotized by the usual method and the excessive nitrous acid was removed with sulfamic acid. To the solution thus obtained was added a neutral aqueous solution containing 33.85 parts of the trisodium salt of 1-amino-2-(3-β-sulfatoethylsulfonylphenylazo)-8-hydroxynaphthalene-3,6-disulfonic acid. The mixture was kept at pH 4–7 at 10°–20° C. for 3 hours by adding dropwise a 15% aqueous solution of sodium carbonate. After diazo compound had become undetectable, the mixture was salted out at pH 4–6 at 30°–40° C. and filtered. The wet cake thus obtained was dissolved into water, the pH of the resulting solution was adjusted to 5–6 by adding an equimolar amount of sodium phosphate monobasic, and the mixture was then dried. Thus, a bisazo compound of which the free acid form is represented by the following formula (5) was obtained:

[$\lambda_{max}$ 610 nm]

EXAMPLE 6

2-Naphthylamine-1-sulfonic acid (11.25 parts) was diazotized by the usual method and the excessive nitrous acid was removed with sulfamic acid. The resulting solution was added to a suspension of 30.55 parts of 1-amino-2-(3-β-sulfatoethylsulfonylphenylazo)-8-hydroxynaphthalene-3,6-disulfonic acid having a temperature of 0°–10° C. and a pH value of 0.5–2 (the suspension was prepared by diazotizing 1-aminobenzene-3-

β-sulfatoethylsulfone by the usual method and then coupling it by adding dropwise a neutral solution of 1-amino-8-hydroxynaphthalene-3,6-disulfonic acid). The pH value of the mixture was adjusted to 6-8.5 by adding sodium hydrogen carbonate at 5°-15° C. over a time period of about one hour, and the resulting mixture was stirred until diazo compound had become undetectable. After adjusting the reaction mixture thus obtained to pH 4.5-5.5, it was dried. Thus, a bisazo compound of which the free acid form is represented by the following formula (6) was obtained:

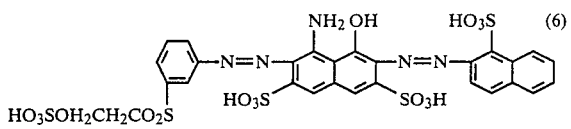

[$\lambda_{max}$ 612 nm]

EXAMPLES 7 TO 8

The procedure of Example 5 was repeated, except that the 2-naphthylamine-1,5-disulfonic acid was replaced with the following starting compounds:

(7) 2-naphthylamine-3,6-disulfonic acid
(8) 2-naphthylamine-1,7-disulfonic acid

As the result, the corresponding bisazo compounds were obtained.

EXAMPLES 9-21

The procedure of Example 1 was repeated, except that the compounds of the formulas (II) and (III) shown in the following table were used. As the result, the corresponding bisazo compounds were obtained.

| Example No. | Amine (II) | Amine (III) |
|---|---|---|
| 9 | HO₃SOH₂CH₂CO₂S—C₆H₄—NH₂ (ortho) | 2-amino-1-naphthalenesulfonic acid (HO₃S at 1, H₂N at 2) |
| 10 | HO₃SOH₂CH₂CO₂S—C₆H₄—NH₂ (ortho) | naphthalene with H₂N, HO₃S (1,2) and SO₃H (7) |
| 11 | HO₃SOH₂CH₂CO₂S—C₆H₄—NH₂ (ortho) | naphthalene with H₂N (2), HO₃S (1), SO₃H (5) |
| 12 | HO₃SOH₂CH₂CO₂S—C₆H₄—NH₂ (ortho) | naphthalene with H₂N (2), HO₃S (3), SO₃H (6) |
| 13 | 4-amino-2-methoxy-5-methylphenyl β-sulfatoethylsulfone (HO₃SOH₂CH₂CO₂S at 1, OCH₃ at 2, NH₂ at 4, CH₃ at 5) | 2-amino-1-naphthalenesulfonic acid |
| 14 | 2-methoxy-5-(β-sulfatoethylsulfonyl)aniline (OCH₃ at 2, NH₂ at 1, HO₃SOH₂CH₂CO₂S at 5) | 2-amino-1-naphthalenesulfonic acid |
| 15 | 2-methoxy-5-(β-sulfatoethylsulfonyl)aniline (CH₃O at 2, NH₂ at 1, HO₃SOH₂CH₂CO₂S at 3) | 2-amino-1-naphthalenesulfonic acid |

| Example No. | Amine (II) | Amine (III) |
|---|---|---|
| 16 | 2-methyl-4-(β-sulfatoethylsulfonyl)-5-methyl aniline (CH3, CH3, NH2, HO3SOH2CH2CO2S) | 2-amino-1-naphthalenesulfonic acid (SO3H, H2N) |
| 17 | 2,5-dimethoxy-4-(β-sulfatoethylsulfonyl)aniline (OCH3, CH3O, NH2, HO3SOH2CH2CO2S) | 2-amino-1-naphthalenesulfonic acid (SO3H, H2N) |
| 18 | 2,5-dimethoxy-4-(β-sulfatoethylsulfonyl)aniline (OCH3, HO3SOH2CH2CO2S, NH2, OCH3) | 2-amino-1,5-naphthalenedisulfonic acid (SO3H, H2N, SO3H) |
| 19 | 2,5-dimethoxy-4-(β-sulfatoethylsulfonyl)aniline (OCH3, HO3SOH2CH2CO2S, NH2, OCH3) | 3-amino-2,7-naphthalenedisulfonic acid (H2N, HO3S, SO3H) |
| 20 | (OCH3, HO3SOH2CH2CO2S, NH2, OCH3) | (HO3S, H2N) 2-amino-1-naphthalenesulfonic acid |
| 21 | (OCH3, HO3SOH2CH2CO2S, NH2, OCH3) | (HO3S, H2N, SO3H) |

EXAMPLE 22

2-Naphthylamine-1-sulfonic acid (11.25 parts) was diazotized by the usual method and the excessive nitrous acid was removed with sulfamic acid. The solution thus obtained was added to a suspension of 33.05 parts of 1-amino-2-(8'-β-sulfatoethylsulfonylnaphthyl-2'-azo)-8-hydroxynaphthalene-3,6-disulfonic acid having a temperature of 0°–10° C. and a pH value of 0.5–2 (the suspension was prepared by diazotizing 2-naphthylamine-8-β-sulfatoethylsulfone by the usual method and then coupling it by adding a neutral solution of 1-amino-8-hydroxynaphthalene-3,6-disulfonic acid thereinto). The mixture was adjusted to pH 8 by adding sodium hydrogen carbonate at 5°–15° C. over a time period of about one hour, and it was stirred until diazo compound had become undetectable. By adjusting the reaction mixture thus obtained to pH 4.5–5.5 and then drying it, a bisazo compound of which the free acid form is represented by the following formula (22) was obtained:

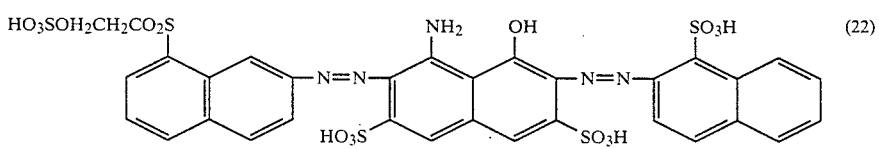

(22)

[$\lambda_{max}$ 620 nm]

EXAMPLES 23 TO 30

The procedure of Example 22 was repeated, except that the compounds of the formulas (II) and (III) shown in the following table were used. As a result, the corresponding bisazo compounds were obtained.

fastnesses and pronouncedly excellent particularly in chlorine fastness.

| Example No. | Amine (II) | Amine (III) |
|---|---|---|
| 23 | 6-amino-naphthalene with HO$_3$SOH$_2$CH$_2$CO$_2$S at position 5 | 2-amino-1-naphthalenesulfonic acid |
| 24 | 6-amino-naphthalene with HO$_3$SOH$_2$CH$_2$CO$_2$S substituent | 2-amino-1-naphthalenesulfonic acid |
| 25 | 6-amino-naphthalene with HO$_3$SOH$_2$CH$_2$CO$_2$S at 1-position and HO$_3$S at 7-position | 2-amino-1-naphthalenesulfonic acid |
| 26 | 2-amino-1-sulfo-naphthalene with HO$_3$SOH$_2$CH$_2$CO$_2$S at 6-position | 2-amino-1-naphthalenesulfonic acid |
| 27 | 6-amino-naphthalene with HO$_3$SOH$_2$CH$_2$CO$_2$S at 1-position | 2-amino-naphthalene-1,5-disulfonic acid |
| 28 | 6-amino-naphthalene with HO$_3$SOH$_2$CH$_2$CO$_2$S at 5-position | 2-amino-naphthalene-1,5-disulfonic acid |
| 29 | 6-amino-naphthalene with HO$_3$SOH$_2$CH$_2$CO$_2$S substituent | 2-amino-naphthalene-1,5-disulfonic acid |
| 30 | 7-amino-naphthalene with HO$_3$SOH$_2$CH$_2$CO$_2$S at 1-position | 2-amino-naphthalene-3,6-disulfonic acid |

EXAMPLE 31

The bisazo compound obtained in Example 1 (0.1 part) was dissolved into 200 parts of water, to which was added 10 parts of sodium sulfate and then was added 10 parts of cotton. Temperature of the mixture was elevated to 50° C. After 30 minutes had passed, 4 parts of sodium carbonate was added and dyeing was carried out at that temperature for one hour. After completion of dyeing, the cotton was washed with water and soaped to obtain a dyed product excellent in When drying was carried out by the same procedure as above using an increased amount (0.3 part in the first instance and 0.6 part in the second instance, in place of the above-mentioned 0.1 part) of said bisazo compound, blue-black colored dyed products having a deep color and excellent bluid-up property were obtained.

The quantities of the bisazo compound fixed on the dyed products thus obtained were determined, from which fixation yields were calculated. Thus, it was determined that the dye had been fixed with an excellent fixation yield, by which color depth of the dyed products was supported.

In the same manner as above, dyeing was carried out using the dyes (2) to (21) to obtain blue-black dyed products having excellent fastnesses, dyeability and build-up properties.

EXAMPLE 32

The bisazo compound (0.1, 0.3 and 0.6 part, respectively) obtained in Example 22 was dissolved in water (200 parts), and sodium sulfate (10 parts) was added to prepare a dye bath. Thereafter, cotton (10 parts) was put in the dye bath which was then heated to 50° C. 30 Minutes thereafter, sodium carbonate (4 parts) was added, and dyeing was carried out at the same temperature for 1 hour. After completion of the dyeing, the cotton was rinsed with water and soaped to obtain blue-black dyed products having excellent fastnesses, particularly chlorine fastness, and excellent bluid-up property.

In the same manner as above, dyeing was carried out using the bisazo compounds (23) to (30) to obtain blue-black dyed products having excellent fastnesses, particularly chlorine fastness and excellent bluid-up properties.

Comparative Example

In order to prove the progressiveness of the bisazo compounds of the present invention, chlorine fastnesses of the compounds were measured and compared with those of known dyes.

1. Procedure of Test

Cotton was dyed using 1% owf of C. I. Reactive Black 5, and the dyed product thus obtained was used as a standard. Thus, cotton was dyed with various dyes so as to give the same color depth as that of the standard. The method of dyeing was in accordance with Example 31 or 32. Then, by ISO method, chlorine fastnesses of the dyed products were measured.

2. Results

The results of the fastness test were expressed in terms of five grades, provided that 1 grade signified the worst and 5 grade signified the best.

All of the dyed products obtained with each of the compounds synthesized in Examples 1–30 had a fastness of 4 grade or 5 grade.

Fastnesses of the dyed products obtained with the dyes mentioned in Published Examined Japanese Patent Application No. 15,299/68 were as shown in the following table. (Q=—$SO_2CH_2CH_2OSO_3H$)

| Run No. | Structure | Chlorine fastness (grade) |
|---|---|---|
| 1 | [structure] | 1 |
| 2 | [structure] | 1 |
| 3 | [structure] | 1 |
| 4 | [structure] | 1–2 |
| 5 | [structure] | 1 |

-continued

| Run No. | Structure | Chlorine fastness (grade) |
|---|---|---|
| 6 | (structure) | 1 |
| 7 | (structure) | 1 |
| 8 | (structure) | 3–4 |
| 9 | (structure) | 1 |
| 10 | (structure) | 1 |
| 11 | (structure) | 1 |
| 12 | (structure) | 3 |
| 13 | (structure) | 1 |
| 14 | (structure) | 1 |

-continued

| Run No. | Structure | Chlorine fastness (grade) |
|---|---|---|
| 15 | 2-methoxyphenyl-Q azo coupled to 8-amino-1-hydroxy-naphthalene-3,6-disulfonic acid with HO$_3$S and SO$_3$H substituents, other azo group to 3-carboxyphenyl | 1 |
| 16 | Q-phenyl-azo coupled to 8-amino-1-hydroxy-naphthalene with HO$_3$S and SO$_3$H, other azo to naphthalene-SO$_3$H | 1 |
| 17 | Q-phenyl-azo coupled to 8-amino-1-hydroxy-naphthalene with HO$_3$S and SO$_3$H, other azo to naphthalene-disulfonic acid | 1 |

Fastnesses of the dyed products obtained from the dyes mentiond in Published Examined Japanese Patent Application No. 4,337/70 were as follows. (Q=—SO$_2$CH$_2$CH$_2$OSO$_3$H)

| Run No. | Structure | Chlorine fastness (grade) |
|---|---|---|
| 1 | O$_2$N-phenyl-azo coupled to 8-amino-1-hydroxy-naphthalene-3,6-disulfonic acid, other azo to phenyl-Q | 1 |
| 2 | Q-phenyl-azo coupled to 8-amino-1-hydroxy-naphthalene-3,6-disulfonic acid, other azo to 4-methoxyphenyl | 1 |
| 3 | O$_2$N-phenyl-azo coupled to 8-amino-1-hydroxy-naphthalene-3,6-disulfonic acid, other azo to 2,5-dimethoxyphenyl-Q | 1-2 |
| 4 | O$_2$N-phenyl-azo coupled to 8-amino-1-hydroxy-naphthalene-3,6-disulfonic acid, other azo to 2-methoxy-5-methylphenyl-Q | 1-2 |
| 5 | Cl-phenyl-azo coupled to 8-amino-1-hydroxy-naphthalene-3,6-disulfonic acid, other azo to phenyl-Q | 1 |

-continued

| Run No. | Structure | Chlorine fastness (grade) |
|---|---|---|
| 6 | 3-Cl-C6H4-N=N-[8-amino-1-hydroxy-naphthalene-3,6-disulfonic acid]-N=N-C6H4-3-Q | 1 |
| 7 | Q-3-C6H4-N=N-[8-amino-1-hydroxy-naphthalene-3,6-disulfonic acid]-N=N-C6H5 | 1 |
| 8 | Q-3-C6H4-N=N-[8-amino-1-hydroxy-naphthalene-3,6-disulfonic acid]-N=N-C6H4-3-OCH3 | 1-2 |
| 9 | Q-3-C6H4-N=N-[8-amino-1-hydroxy-naphthalene-3,6-disulfonic acid]-N=N-C6H4-3-Cl | 1 |
| 10 | Q-3-C6H4-N=N-[8-amino-1-hydroxy-naphthalene-3,6-disulfonic acid]-N=N-C6H4-4-CH3 | 1 |
| 11 | Q-3-C6H4-N=N-[8-amino-1-hydroxy-naphthalene-3,6-disulfonic acid]-N=N-C6H4-3-OCH3 | 1 |
| 12 | Q-3-C6H4-N=N-[8-amino-1-hydroxy-naphthalene-3,6-disulfonic acid]-N=N-C6H4-4-Cl | 1 |
| 13 | Q-3-C6H4-N=N-[8-amino-1-hydroxy-naphthalene-3,6-disulfonic acid]-N=N-C6H4-4-CO-C6H5 | 1 |
| 14 | Q-3-C6H4-N=N-[8-amino-1-hydroxy-naphthalene-3,6-disulfonic acid]-N=N-C6H4-3-CO2H | 1 |

| Run No. | Structure | Chlorine fastness (grade) |
|---|---|---|
| 15 | (structure: phenyl-Q with N=N to naphthalene core bearing NH₂, OH, HO₃S, SO₃H, with N=N to phenyl-SO₃H) | 1 |
| 16 | (structure: naphthalene-SO₃H/HO₃S with N=N to naphthalene core bearing NH₂, OH, HO₃S, SO₃H, with N=N to phenyl bearing CH₃O, Q, OCH₃) | 1–2 |
| 17 | (structure: naphthalene-Q with N=N to naphthalene core bearing NH₂, OH, HO₃S, SO₃H, with N=N to phenyl bearing CH₃O, SO₃H, OCH₃) | 1–2 |
| 18 | (structure: phenyl-Q with N=N to naphthalene core bearing NH₂, OH, SO₃H, with N=N to phenyl-SO₃H) | 1 |
| 19 | (structure: HO₃S-phenyl with N=N to naphthalene core bearing NH₂, OH, HO₃S, SO₃H, with N=N to phenyl-Q) | 1 |

Fastnesses of the dyed products obtained from the dyes mentioned in German Patent No. 1,644,198 were as follows. Some of the dyes mentioned here may be the same as those mentioned in Published Examined Japanese Patent Application No. 4,337/70. (Q=—SO₂CH₂CH₂OSO₃H)

| Run No. | Structure | Chlorine fastness (grade) |
|---|---|---|
| 1 | (structure: O₂N-phenyl-N=N-naphthalene(NH₂,OH,HO₃S,SO₃H)-N=N-phenyl-Q) | 1 |
| 2 | (structure: Q-phenyl-N=N-naphthalene(NH₂,OH,HO₃S,SO₃H)-N=N-phenyl-OCH₃) | 1 |
| 3 | (structure: O₂N-phenyl-N=N-naphthalene(NH₂,OH,HO₃S,SO₃H)-N=N-phenyl-Q) | 1 |

| Run No. | Structure | Chlorine fastness (grade) |
|---|---|---|
| 4 | 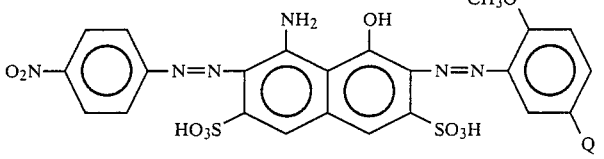 | 1–2 |
| 5 | 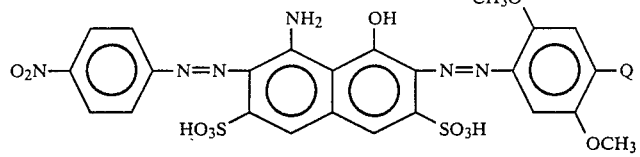 | 1–2 |
| 6 | 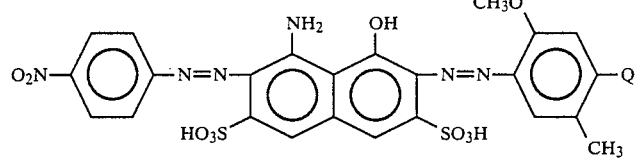 | 1–2 |
| 7 | 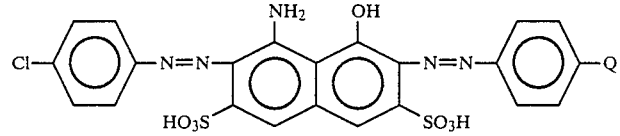 | 1 |
| 8 | 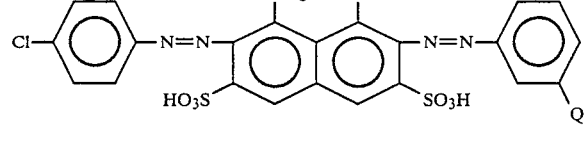 | 1 |
| 9 | 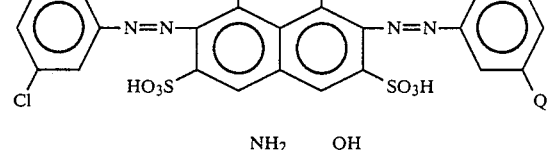 | 1 |
| 10 | 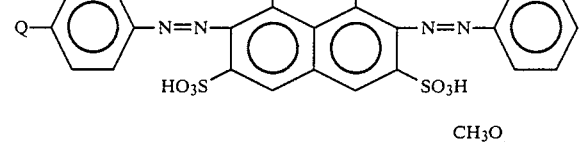 | 1 |
| 11 | 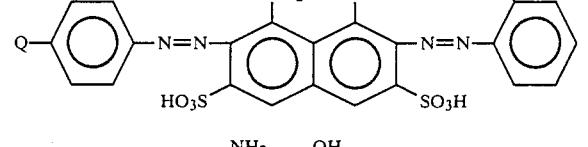 | 1–2 |
| 12 | 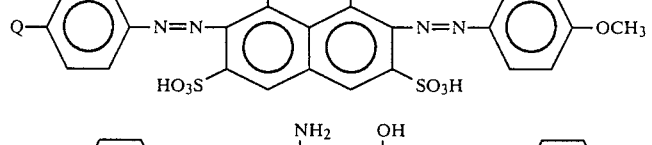 | 1 |
| 13 | 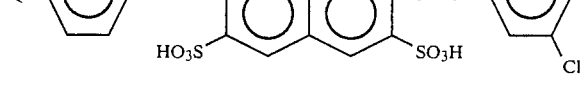 | 1 |

| Run No. | Structure | Chlorine fastness (grade) |
|---|---|---|
| 14 | 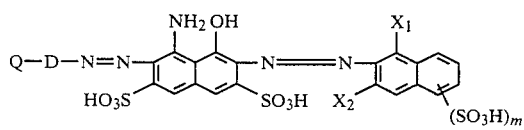 | 1 |
| 15 | | 1-2 |
| 16 | | 1-2 |
| 17 | | 1 |
| 18 | | 1 |

A dyed product obtained by dyeing cotton with C. I. Reactive Black 5 had a chlorine fasteness of 1 grade.

What is claimed is:

1. A compound represented by a free acid of the formula:

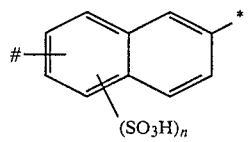

wherein D is

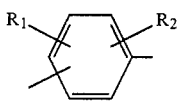

($R_1$ and $R_2$ independently represent hydrogen, methyl or methoxy or (n is 0 or 1, the mark * signifies the position of linkage to —N=N— and the mark # signifies the position of linkage to Q mentioned below); Q is —$SO_2CH=CH_2$ or —$SO_2CH_2CH_2R$ (R is a group capable of being split off by the action of alkali), one of $X_1$ and $X_2$ is hydrogen and the other is a sulfonic acid group; and m is 0 or 1.

2. A compound represented by a free acid of the formula:

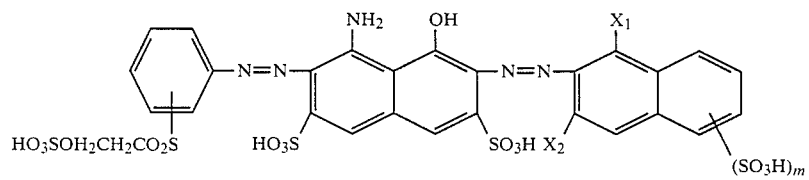

wherein one of $X_1$ and $X_2$ is hydrogen and the other is a sulfonic acid group; m is 0 or 1; and —$SO_2CH_2C$-

H₂OSO₃H exists in the ortho-, meta- or para-position with regard to —N=N—.

3. A compound represented by a free acid of the formula:

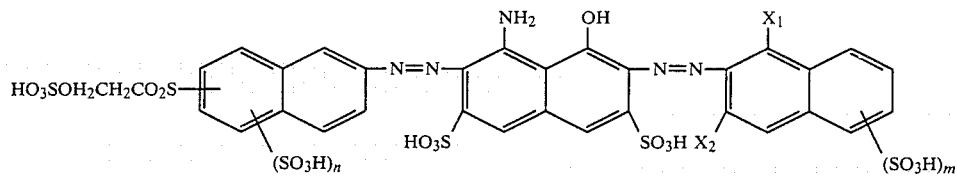

wherein one of $X_1$ and $X_2$ is hydrogen and the other is a sulfonic acid group; and m and n independently represent 0 or 1.

4. A compound represented by a free acid of the formula,

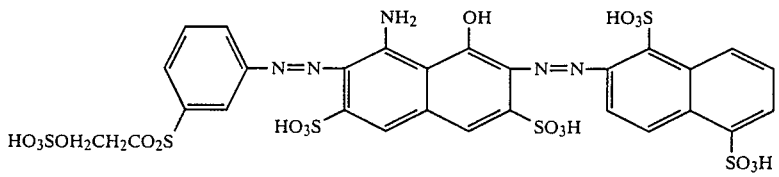

5. A compound represented by a free acid of the formula,

6. A compound represented by a free acid of the formula,

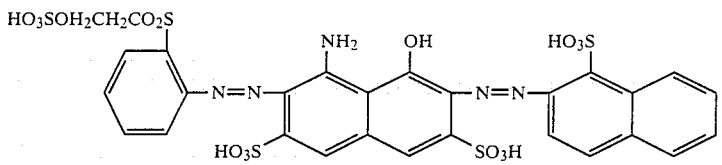

7. A compound represented by a free acid of the formula,

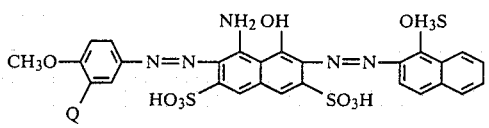

wherein Q is —SO₂CH=CH₂ or —SO₂CH₂CH₂R (R is a group capable of being split off by the action of alkali).

* * * * *